United States Patent
Fiorese et al.

(10) Patent No.: US 11,419,046 B2
(45) Date of Patent: Aug. 16, 2022

(54) METHODS AND SYSTEMS FOR PERFORMING MULTI-DOMAIN NETWORK SLICE SELECTION AND APPROVAL

(71) Applicant: Telefonaktiebolaget LM Ericsson (publ), Stockholm (SE)

(72) Inventors: Virgilio Fiorese, McKinney, TX (US); Ignacio Rivas Molina, Madrid (ES); Nipun Sharma, New Delhi (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 123 days.

(21) Appl. No.: 17/047,129

(22) PCT Filed: Apr. 13, 2018

(86) PCT No.: PCT/IB2018/052600
§ 371 (c)(1),
(2) Date: Oct. 13, 2020

(87) PCT Pub. No.: WO2019/197883
PCT Pub. Date: Oct. 17, 2019

(65) Prior Publication Data
US 2021/0168705 A1 Jun. 3, 2021

(51) Int. Cl.
*H04W 48/18* (2009.01)
*H04W 12/037* (2021.01)
(Continued)

(52) U.S. Cl.
CPC .......... *H04W 48/18* (2013.01); *H04W 8/08* (2013.01); *H04W 12/037* (2021.01);
(Continued)

(58) Field of Classification Search
CPC ..... H04W 60/00; H04W 48/18; H04W 76/11; H04W 76/12; H04W 8/08; H04W 12/06;
(Continued)

(56) References Cited

U.S. PATENT DOCUMENTS

2017/0164212 A1 6/2017 Opsenica et al.
2017/0303259 A1 10/2017 Lee et al.
(Continued)

FOREIGN PATENT DOCUMENTS

WO 2018013925 A1 1/2018

OTHER PUBLICATIONS

Author Unknown, "Technical Specification Group Services and System Aspects; Service requirements for the 5G system; Stage 1 (Release 16)," Technical Specification 22.261, Version 16.3.0, 3GPP Organizational Partners, Mar. 2018, 54 pages.
(Continued)

*Primary Examiner* — Kwasi Karikari
(74) *Attorney, Agent, or Firm* — Withrow & Terranova, PLLC

(57) ABSTRACT

Methods and systems for performing multi-domain network slice selection and approval are provided. According to one aspect, a method performed by a Network Slice Selection Function comprises: receiving, from a requesting entity, a request for a network slice for use by a client device; upon determining that the network slice selection requires approval, identifying an Authorizing Network Function (ANF) for authorizing a network slice for the client device; determining a trust status of the ANF; identifying, based on the trust status, a network interface to use when communicating with the ANF; sending a slice selection authorization request to the ANF via the identified network interface; receiving from the ANF an approval status of a network slice; determining, based on the approval status and approval conditions, an allowed network slice; and sending, to the requesting entity, information including the allowed network slice.

54 Claims, 13 Drawing Sheets

(51) Int. Cl.
*H04W 8/08* (2009.01)
*H04W 12/06* (2021.01)
*H04W 12/08* (2021.01)
*H04W 12/64* (2021.01)

(52) U.S. Cl.
CPC ............ *H04W 12/06* (2013.01); *H04W 12/08* (2013.01); *H04W 12/64* (2021.01)

(58) Field of Classification Search
CPC ....... H04W 8/24; H04W 24/02; H04W 48/16; H04W 28/24; H04W 8/22; H04W 60/06; H04W 72/1257; H04W 36/0088; H04W 8/205; H04W 88/02; H04W 12/037; H04W 12/37
See application file for complete search history.

(56) References Cited

U.S. PATENT DOCUMENTS

| | | | |
|---|---|---|---|
| 2017/0359768 A1 | 12/2017 | Byun et al. | |
| 2019/0053104 A1* | 2/2019 | Qiao | ........................ H04L 47/20 |
| 2019/0215731 A1* | 7/2019 | Qiao | ..................... H04W 24/10 |
| 2020/0389830 A1* | 12/2020 | Park | ................... H04W 28/0226 |

OTHER PUBLICATIONS

Author Unknown, "Technical Specification Group Services and System Aspects; System Architecture for the 5G System; Stage 2 (Release 15)," Technical Specification 23.501, Version 1.3.0, 3GPP Organizational Partners, Sep. 2017, 174 pages.

Author Unknown, "Technical Specification Group Services and System Aspects; System Architecture for the 5G System; Stage 2 (Release 15)," Technical Specification 23.501, Version 15.0.0, 3GPP Organizational Partners, Dec. 2017, 181 pages.

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.

Author Unknown, "Technical Specification Group Services and System Aspects; Procedures for the 5G System; Stage 2 (Release 15)," Technical Specification 23.502, Version 1.2.0, 3GPP Organizational Partners, Sep. 2017, 165 pages.

Author Unknown, "Technical Specification Group Services and System Aspects; Procedures for the 5G System; Stage 2 (Release 15)," Technical Specification 23.502, Version 15.0.0, 3GPP Organizational Partners, Dec. 2017, 258 pages.

Author Unknown, "Technical Specification Group Services and System Aspects; Policy and Charging Control Framework for the 5G System; Stage 2 (Release 15)," Technical Specification 23.503, Version 1.0.0, 3GPP Organizational Partners, Dec. 2017, 56 pages.

Author Unknown, "Technical Specification Group Services and System Aspects; Policy and Charging Control Framework for the 5G System; Stage 2 (Release 15)," Technical Specification 23.503, Version 15.1.0, 3GPP Organizational Partners, Mar. 2018, 65 pages.

Author Unknown, "3GPP SCEF Primer," Definition Networks, Published May 15, 2016, retrieved Oct. 7, 2020, URL: "http://www.definitionnetworks.com/3gpp-scef-primer/", 4 pages.

Nokia et al., "S2-175693: Network Slice access subscription management by a third party," Third Generation Partnership Project (3GPP), SA WG2 Meeting #122bis, Aug. 21-25, 2017, 6 pages, Sophia Antipolis, France.

International Search Report and Written Opinion for International Patent Application No. PCT/IB2018/052600, dated Oct. 9, 2018, 17 pages.

* cited by examiner

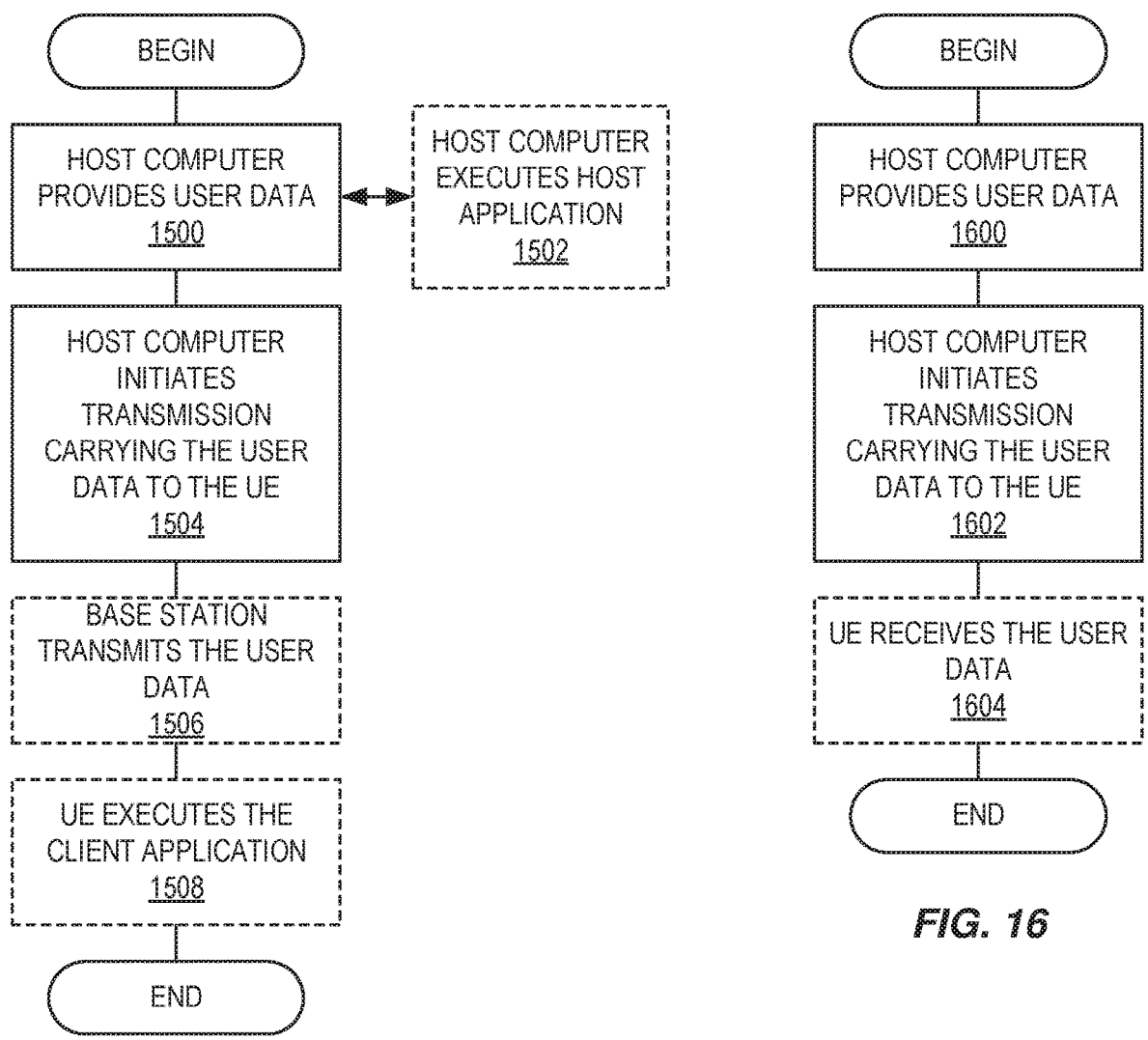

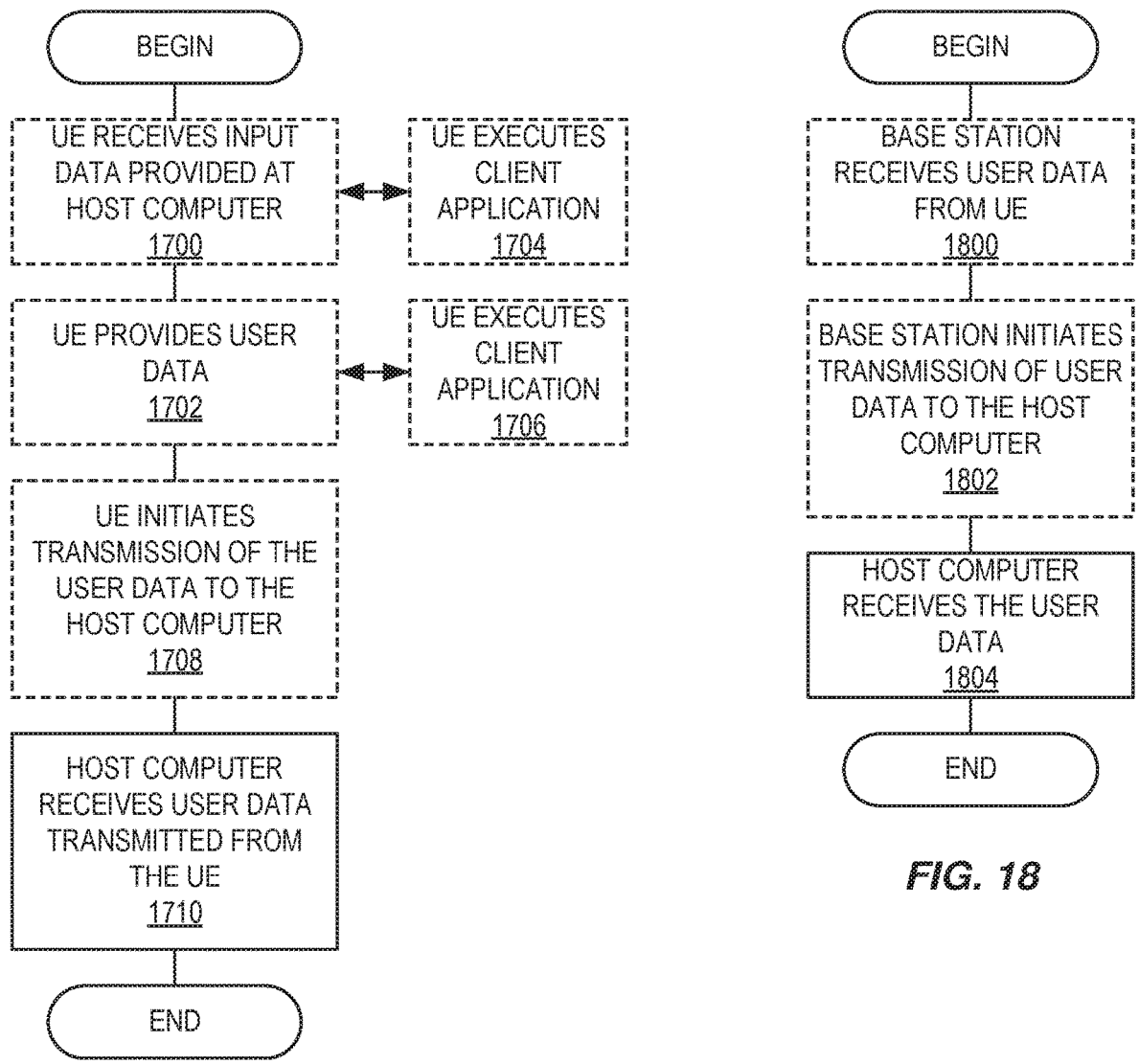

METHODS AND SYSTEMS FOR PERFORMING MULTI-DOMAIN NETWORK SLICE SELECTION AND APPROVAL

TECHNICAL FIELD

The present disclosure relates to network slice selection and approval.

This application is a 35 U.S.C. § 371 national phase filing of International Application No. PCT/IB2018/052600, filed Apr. 13, 2018, the disclosure of which is incorporated herein by reference in its entirety.

BACKGROUND

Network slicing is a key Fifth Generation (5G) network concept introduced to model and realize specific and dedicated connectivity services over network service provider networks.

There are pre-5G mechanisms that can be considered as precursors to 5G network slicing. One example is the use of different Access Point Names (APNs) for different services. These APNs may even be allocated to dedicated (physical) Packet Data Network Gateways (PGWs) to provide additional security and resource separation between the "slices" (for example, different APNs for Voice over Long Term Evolution (LTE) (VoLTE)/Internet Protocol (IP) Multimedia Subsystem (IMS) and Mobile Broadband (MBB)). Quality of Service (QoS) Class Identifiers (QCIs) could be used to ensure that bearer traffic is allocated an appropriate QoS in the Radio Access Network (RAN). In Evolved Packet Core (EPC) there are also the concepts like Dedicated Core Network (DECOR) and further evolution with enhanced DECOR (eDECOR), etc., providing additional tools to create network slices.

These pre-5G mechanisms can be seen as rudimentary network slice solutions because they limit a User Equipment (UE) to a single network slice and don't allow a UE to have multiple network slices for each Protocol Data Unit (PDU) session. It should be noted that in LTE allows multiple APNs for the same UE, but with the limitation that all APNs (logical paths) were carried by the same physical path. In contrast, 5G network slicing (a) allows simultaneous connectivity to multiple network slices per UE, the multiple network slices not being constrained to all occupy the same physical path, (b) extends network slicing awareness out to the RAN—that is, 5G network slices are "end-to-end," and (c) enhances the possibilities to provide isolation between network slices.

As used herein, the term "(R)AN" refers to an entity that may be Radio Access Network, a (non-radio) Access Network, or a combination of the two. Hereinafter, the terms "RAN" and "(R)AN" will be used synonymously, except where "RAN" is explicitly indicated as referring to a Radio Access Network exclusively.

5G network slicing also introduces the concept of Network Slice Selection Assistance Information (NSSAI) to assist slice selection. The NSSAI consists of a list of Single NSSAIs (S-NSSAIs). A network, such as a Public Land Mobile Network (PLMN), combines different 5G core network elements to deliver much more flexible types of network slices (i.e., NSSAIs), and these network slices can be delivered in real time based on S-NSSAIs values provided in the N1 interface.

Network Slice Selection Function (NSSF)

The key element of the conventional 5G Core Network slice selection process is the Network Slice Selection Function (NSSF). As the name suggests, this is the 5G network function in charge of network slice selection. Currently, Technical Specification (TS) 23.501 defines the functionality of the NSSF as follows:

Selecting the set of Network Slice instances serving the UE;

Determining the Allowed NSSAI and, if needed, the mapping to the Subscribed S-NSSAIs; and Determining the Core Access and Mobility Management Function (AMF) set to be used to serve the UE.

To perform those tasks, the NSSF is typically a PLMN level function, so that it has visibility into the network slices supported across the PLMN, and also holds the operator policies (conditions) for network slice selection. This is referred to as a self-contained decision process, with very limited influence of additional network functions outside NSSF and almost no influence from network slice owners, sponsors, approvers.

The NSSF interfaces with:

The AMF, through the N22 reference point, during UE Registration and PDU session establishment;

The NSSF in the home network, through the N31 reference point, in home routed roaming scenarios; and The Network Data Analytics Function (NWDAF), to collect slice-specific network data analytics (e.g., load level information).

However, none of those interfaces includes the network slice owner's approval process.

Conventional 5G Network Slice Selection

Network Slicing and Slice Selection in 5G System (5GS) is specified in the Third Generation Partnership Project (3GPP) TS 23.501 (herein referred to as "TS 23.501"). Relevant extracts of TS 23.501 are mentioned below.

An S-NSSAI identifies a Network Slice. An S-NSSAI is comprised of:

A Slice/Service type (SST), which refers to the expected Network Slice behavior in terms of features and services; and A Slice Differentiator (SD), which is optional information that complements the Slice/Service type(s) to differentiate amongst multiple Network Slices of the same Slice/Service type.

An S-NSSAI can have standard values or non-standard values. S-NSSAIs with PLMN-specific values are associated with the PLMN Identifier (ID) of the PLMN that assigns it. An S-NSSAI shall not be used by the UE in access stratum procedures in any PLMN other than the one to which the S-NSSAI is associated. A subscribed S-NSSAI is one that the UE subscribes to.

The NSSAI is a collection of S-NSSAIs. An NSSAI may be a Configured NSSAI, a Requested NSSAI, or an Allowed NSSAI. There can be at most eight S-NSSAIs in Allowed and Requested NSSAIs sent in signaling messages between the UE and the Network. The Requested NSSAI signaled by the UE to the network allows the network to select the Serving AMF, Network Slice(s), and Network Slice instance(s) for this UE, as specified in sub-clause 5.15.5 of TS 23.501.

Conventional 5G Registration

FIGS. 1 and 2 illustrate portions of a conventional registration procedure in a 5G network. As described in TS 23.502, section 4.2.2.2.2, when a RAN receives a registration request, it may in some circumstances select an AMF based in part on the Requested NSSAI, if available, and forward the registration message to the AMF based on the N2 connection of the UE. This is illustrated in FIG. 1, in which a UE issues a registration request to a RAN (step 100), the RAN determines that it can select an AMF and does so (step 102) and forwards the registration request to the selected AMF (step 104). Under the current 5G specification, the RAN does not query an NSSF. As illustrated in FIG. 2, if the RAN receives a registration request (step 200) and determines that it cannot select an appropriate AMF (step 202), the RAN forwards the registration request to an AMF which has been configured, in the RAN, to perform AMF selection (step 204). If the UE context in the AMF does not yet include an Allowed NSSAI, the AMF queries the NSSF, except in the case when, based on configuration in this AMF, the AMF is allowed to determine whether it can serve the UE and therefore does not query the NSSF (a scenario not illustrated in FIG. 2, however).

When an AMF needs to query the NSSF, the AMF queries the NSSF (step 206), with Requested NSSAI, mapping of Requested NSSAI to Configured NSSAI for the Home PLMN (HPLMN), the Subscribed S-NSSAIs (with an indication if marked as default S-NSSAI), PLMN ID of the Subscriber Permanent Identifier (SUPI) and UE's current Tracking Area(s). Based on this information, local configuration, and other locally available information including RAN capabilities in the current Tracking Area for the UE, the NSSF does the following:

1. It verifies whether the S-NSSAI(s) in the Requested NSSAI are permitted based on the Subscribed S-NSSAIs and the mapping of Requested NSSAI to Configured NSSAI for the HPLMN.
2. It selects the Network Slice instance(s) to serve the UE (step 208). When multiple Network Slice instances in the UE's Tracking Areas are able to serve a given S-NSSAI, based on operator's configuration, the NSSF may select one of them to serve the UE, or the NSSF may defer the selection of the Network Slice instance until a Network Function (NF)/service within the Network Slice instance needs to be selected.
3. It determines the target AMF Set to be used to serve the UE (step 210), or, based on configuration, the list of candidate AMF(s), possibly after querying the Network Resource Function (NRF).
4. It determines the Allowed NSSAI, taking also into account the availability of the Network Slice instances as described in clause 5.15.8 of TS 23.501 that are able to serve the S-NSSAI(s) in the Allowed NSSAI in the current UE's Tracking Areas.
5. It also determines the mapping of each S-NSSAI of the Allowed NSSAI to the Subscribed S-NSSAIs if necessary.
6. Based on operator configuration, the NSSF may determine the NRF(s) to be used to select NFs/services within the selected Network Slice instance(s).
7. Additional processing to determine the Allowed NSSAI in roaming scenarios and the mapping to the Subscribed S-NSSAIs, as described in clause 5.15.6 of TS 23.501.

The NSSF returns to the current AMF the Allowed NSSAI, the mapping if determined and the target AMF Set, or, based on configuration, the list of candidate AMF(s) (step 212). The NSSF may return the NRF(s) to be used to select NFs/services within the selected Network Slice instance(s), and the NRF to be used to determine the list of candidate AMF(s) from the AMF Set. The NSSF may return Network Slice Instance (NSI) ID(s) to be associated with the Network Slice instance(s) corresponding to certain S-NSSAIs. NSSF may return the rejected S-NSSAI(s) as described in clause 5.15.4.1 of TS 23.501.

Depending on the available information and based on configuration, the AMF may query the appropriate NRF (e.g., locally pre-configured or provided by the NSSF) with the target AMF Set. The NRF returns a list of candidate AMFs.

If rerouting to a target serving AMF is necessary, the current AMF reroutes the Registration Request to a target serving AMF as described in clause 5.15.5.2.3 of TS 23.501 (steps 214 and 216).

Problems with Conventional NSSFs

It should be noted that the volume of Network Slices to be managed by the NSSF of each Mobile Network Operator (MNO) can be as many as multiple slices for each MNO Business-to-Business (B2B) customer. This translates to thousands, if not millions, of different Network Slice IDs and contract relationships. The same is true for Mobile Virtual Network Operators (MVNOs), which may need slices based on the needs of their consumers or enterprise customers. To be more specific, each Online Service provider, e.g., the famous "Internet" native companies, sometimes known as Over-the-Top (OTT) providers, searching tools, social networks, content streaming services, etc., may have one or multiple network slices from the MNOs. Also, every enterprise company may have multiple network slices according to their different UE/Customer Premises Equipment (CPE) or application needs. It is further noted that different Industries, such as agribusiness, healthcare, aviation, etc., may decide to be standardized to use multiple network slices for their different industry demands. All of the aspects noted above bring a new level of complexity in the relationship between MNOs and the network slice owners, sponsors or approvers.

During the UE registration procedure, the AMF queries the NSSF via the Nnssf_NSSelection service, and provides the following information:
Requested NSSAI;
Mapping of Requested NSSAI;
Subscribed S-NSSAIs;
Tracking Area Identity (TAI); and
PLMN ID of the SUPI.

A straight-forward extension is that the AMF provides to the NSSF the SUPI for which network slice selection is to be performed. But even in this case, the NSSF can only perform network slice selection based on subscriber profile information, location, time of day conditions, network condition information coming from the analytics system, local configuration (NSSF provisioned operator policies), and, possibly, information related to the services and the PDU session. There is no mechanism for a network slice owner's approval process.

In summary, although a conventional NSSF is currently best suited to make network slice selection within the scope of the 5G core network such as AMF/Session Management Function (SMF)/Unified Data Management (UDM) nodes, in relation to the data connectivity and services and network conditions, a conventional NSSF is not prepared to make decisions based on other trusted domains, such as:
The Online Charging System (OCS) domain,
The Network Data Analytics and Automation (NWDA) domain, other than a decision based on load information,
The Software Defined Network (SDN) domain, and
The Open Network Automation Platform (ONAP) domain.

For untrusted domains, such as domains outside the MNO network, a conventional NSSF is even less prepared to use information from these external players to make decisions on network slices. Such domains include, but are not limited to:
  Online Services applications (sometimes called OTTs) domain,
  Enterprise/Industries domain, and
  MVNOs domain.

In short, policies for network automation such as slice selection and/or approval processes are currently out of the scope of the NSSF, limiting MNOs' capabilities for network automation.

SUMMARY

The present disclosure provides methods and systems for performing multi-domain network slice selection and approval.

According to one aspect of the present disclosure, a method for performing multi-domain network slice selection and approval, the method being performed by a network node in a telecommunications network, comprises: receiving, from a requesting entity, a request for a network slice for use by a client device; determining that the network slice selection requires approval; upon determining that the network slice selection requires approval, identifying an authorizing network function for authorizing a network slice for the client device; determining a trust status of the authorizing network function; identifying, based on the trust status of the authorizing network function, a network interface to use when communicating with the authorizing network function; sending a slice selection authorization request to the authorizing network function via the identified network interface; receiving, from the authorizing network function, an approval status of a network slice and determining, based on the approval status, an allowed network slice; and sending, to the requesting entity, information including the allowed network slice.

In some embodiments, the network node that performs the method comprises a Fifth Generation (5G) network node.

In some embodiments, the client device comprises a User Equipment (UE) or a Customer Premises Equipment (CPE).

In some embodiments, the network node that performs the method comprises a Network Slice Selection Function (NSSF).

In some embodiments, the requesting entity comprises a Core Access and Mobility Management Function (AMF).

In some embodiments, the request for the network slice comprises: a requested Network Slice Selection Assistance Information (NSSAI); a mapping of the requested NSSAI; a subscribed NSSAI; a Tracking Area Identity (TAI); and a Subscriber Permanent Identity (SUPI).

In some embodiments, the SUPI is obtained from the client device via a N1 interface.

In some embodiments, the determination that the network slice selection requires approval is based on subscriber profile information.

In some embodiments, the subscriber profile information comprises network slice selection parameters that indicate, on a per subscriber or per subscriber group basis, that approval is required and identify the authorizing network function.

In some embodiments, the subscriber profile information is stored within the network node.

In some embodiments, the subscriber profile information is stored in a database outside of the network node.

In some embodiments, the database outside of the network node comprises a Unified Data Management (UDM) node.

In some embodiments, the determination that the network slice selection requires approval is based on a requested NSSAI.

In some embodiments, the requested NSSAI is subject to external approval based on a local configuration of the network node and/or operator policies.

In some embodiments, the determination that the network slice selection requires approval is based the subscribed NSSAI.

In some embodiments, the subscribed NSSAI is subject to external approval based on a local configuration of the network node and/or operator policies.

In some embodiments, the authorizing network function is identified based on a subscriber parameter, an NSSAI parameter, and/or an approver parameter.

In some embodiments, determining the trust status of the authorizing network function comprises determining that the authorizing network function is a trusted approver.

In some embodiments, identifying the network interface to use when communicating with the authorizing network function comprises determining an address or identifier of the authorizing network function.

In some embodiments, determining the address or identifier of the authorizing network function comprises querying a Network Resource Function (NRF) which provides the address or identifier of the authorizing network function.

In some embodiments, determining the address or identifier of the authorizing network function comprises determining the address or identifier of the authorizing network function via information provisioned in the network node In some embodiments, determining the trust status of the authorizing network function comprises determining that the authorizing network function is an untrusted approver.

In some embodiments, identifying the network interface to use when communicating with the authorizing network function comprises identifying the network interface via information provisioned in the network node.

In some embodiments, the information provisioned in the network node is provisioned via an Application Programming Interface (API) that allows trusted and untrusted network functions to communicate with the network node.

In some embodiments, the API allows trusted and untrusted network functions to communicate with the network node directly or indirectly via a Network Exposure Function (NEF).

In some embodiments, the API allows trusted and untrusted network functions to access a database maintained by the network node.

In some embodiments, the identified API is provisioned in the network node.

In some embodiments, determining the trust status of the authorizing network function comprises: upon a determination that the authorizing network function is within a domain of the network operator, determining that the authorizing network function is trusted; and upon a determination that the authorizing network function is not within a domain of the network operator, determining that the authorizing network function is untrusted.

In some embodiments, identifying the network interface to use when communicating with the authorizing network function based on the trust status of the authorizing network function comprises: upon a determination that the authorizing network function is untrusted, determining that communication with the authorizing network function must flow through a NEF; and upon a determination that the authorizing network function is trusted, determining that communication with the authorizing network function does not flow through the NEF.

In some embodiments, sending the slice selection authorization request to the authorizing network function via the identified network interface comprises sending the request via a NEF.

In some embodiments, the slice selection authorization request is encrypted or tokenized.

In some embodiments, determining the allowed network slice based on the approval status and approval conditions comprises performing a time-based approval in which the network node requests re-approval after a specified time has expired.

In some embodiments, determining the allowed network slice based on the approval status and approval conditions comprises performing a mobility restriction in which the network node requests re-approval when the client device moves out of its current location area.

In some embodiments, the current location area of the client device comprises a Tracking Area, a Routing Area, a Global Positioning System (GPS) location, or a GPS location area.

In some embodiments, the current location of the client device comprises a GPS location area tracked by a "digital fence" function within the AMF.

In some embodiments, upon denial of a request for re-approval the network node instructs the AMF serving the network slice to discontinue serving the network slice.

In some embodiments, the method further comprises, prior to sending the information including the allowed slice to the requesting entity, determining whether additional information or authorization is needed, and upon determining that additional information or authorization is needed, reiterating the steps starting from identifying the authorizing network function and continuing until no additional information or authorization is needed before proceeding to sending the information including the allowed slice to the requesting entity.

In some embodiments, receiving an approval status from the authorizing network function comprises receiving a pre-approved credit per slice.

In some embodiments, the pre-approved credit per slice is based on information provided by a Pre-Paid services node.

In some embodiments, the pre-approved credit per slice defines a data volume, a maximum number of devices, and/or a time limit for the respective slice.

In some embodiments, receiving an approval status comprises receiving an approval status and approval conditions.

In some embodiments, receiving approval conditions from the authorizing network function comprises receiving a mobility restriction.

In some embodiments, receiving a mobility restriction comprises receiving a restriction that a slice is available if the client device is within a defined location.

In some embodiments, the defined location comprises a tracking area, a routing area, and/or a geographic location, area, or volume.

In some embodiments, receiving approval conditions from the authorizing network function comprises receiving a schedule-based restriction.

In some embodiments, the schedule-based restriction comprises a restriction that a slice is available during defined dates, times, days of the week, weeks or months of the year, seasons, and/or holidays.

In some embodiments, receiving approval conditions from the authorizing network function comprises receiving a location-based slice restriction.

In some embodiments, receiving a location-based slice restriction comprises receiving a restriction that a User Plane Function (UPF) is selected or redirected based on a user's geographical location and/or network location.

In some embodiments, receiving approval conditions from the authorizing network function comprises receiving an online services or Over-the-Top (OTT) approval condition.

In some embodiments, receiving an online services or OTT approval condition comprises receiving at least one of: a user account validation; a restriction that a slice is available for a defined content type; a restriction that a slice is available for a defined Uniform Resource Locator (URL) or Internet Protocol (IP) address; a restriction that a slice is allocated or modified based on a location of a user of the slice.

In some embodiments, receiving approval conditions from the authorizing network function comprises receiving an enterprise agreement requirement.

In some embodiments, receiving an enterprise agreement requirement comprises receiving at least one of: a privacy requirement; an encryption requirement; a reliability or ultra-reliability requirement; a pre-approval requirement; an authorized devices requirement; a Bring Your Own Device (BYOD) requirement; and an enterprise-redirected application.

According to another aspect of the present disclosure, a network node for performing multi-domain network slice selection and approval comprises a network interface and circuitry configured to receive, from a requesting entity, a request for a network slice for use by a client device; determine that the network slice selection requires approval; upon determining that the network slice selection requires approval, identify an authorizing network function for authorizing the network slice for the client device; determine a trust status of the authorizing network function; identify, based on the trust status of the authorizing network function, a network interface to use when communicating with the authorizing network function; send a slice selection authorization request to the authorizing network function via the identified network interface; receive, from the authorizing network function, an approval status of the network slice and determine, based on the approval status, an allowed network slice; and send, to the requesting entity, information including the allowed network slice.

According to another aspect of the present disclosure, a network node for performing multi-domain network slice selection and approval comprises a network interface and circuitry configured to perform any of the methods disclosed herein.

In some embodiments, the network node comprises a NSSF.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 15 is a flowchart illustrating a method implemented in a communication system in accordance with one embodiment of the present disclosure;

FIG. 16 is a flowchart illustrating a method implemented in a communication system in accordance with one embodiment of the present disclosure;

FIG. 17 is a flowchart illustrating a method implemented in a communication system in accordance with one embodiment on the present disclosure; and FIG. 18 is a flowchart illustrating a method implemented in a communication system in accordance with one embodiment of the present disclosure.

DETAILED DESCRIPTION

Figure 1:
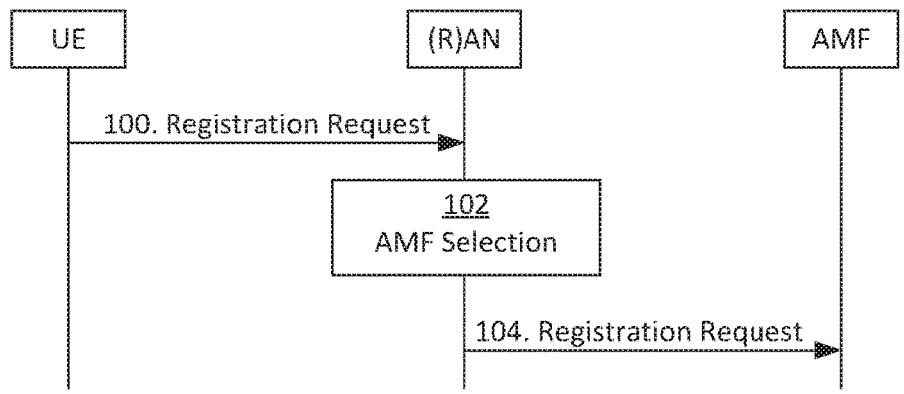
FIG. 1 illustrates some portions of a conventional registration procedure in a Fifth Generation (5G) network.
Figure 2:
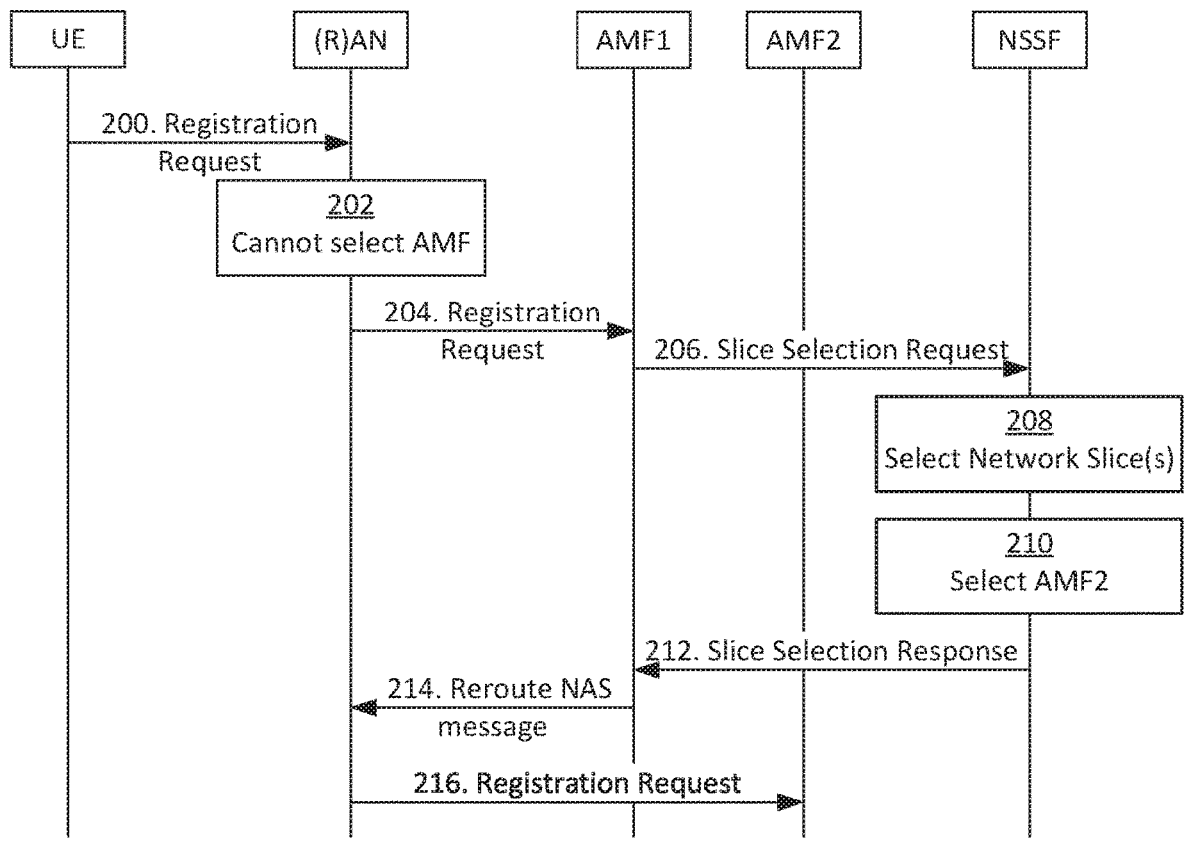
FIG. 2 illustrates other portions of a conventional registration procedure in a 5G network.

Methods and systems to for performing multi-domain network slice selection and approval are presented herein. The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) Base Station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node (e.g., a radio relay node or other node that provides a modem/router capability to connect devices with different Radio Access Technology (RAT) bearers).

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device. Other examples include, but are not limited to, Customer Premises Equipment (CPE), wireless CPE, used for example to provide Fixed Wireless Services (FWS) and/or as a home modem.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As stated above, a conventional Network Slice Selection Function, (NSSF) can make network slice selections within the scope of the 5G core network including such trusted domains as a Core Access an Mobility Management Function (AMF), a Session Management Function (SMF), and a Unified Data Management (UDM) node in relation to the data connectivity and services and network conditions.

However, a conventional NSSF does not make a decision based on other trusted domains, such as the Online Charging System (OCS) domain, the Network Data Analytics and Automation (NWDA) domain using information other than network load, the Software Defined Network (SDN) domain, and the Open Network Automation Platform (ONAP) domain. Moreover, for untrusted domains, such as domains outside the Mobile Network Operator (MNO) network, such as online services applications or Over-the-Top (OTT) providers, enterprise domains, industry domains, Mobile Virtual Network Operator (MVNO) domains, etc., a conventional NSSF cannot use information from these external players to make decisions on network slices.

Thus, there is a need mechanisms for a NSSF to use information from other trusted domains and from untrusted domains to make decisions on network slices, and particularly for a method of network slice selection/approval that would only allow Network Slice Selection Assistance Information (NSSAI) resource allocation after the 5G Core System checks the pre-conditions beyond the availability of slices in terms of capacity and/or capabilities.

These additional network slice selection process/approval policies could be for example but not limited to:

a pre-approved credit per slice bucket, e.g., based on information provided by Pre-Paid services;

mobility restrictions, e.g., that some slices are available only in certain locations;

time based restrictions, e.g., that some slices are available only for certain durations of time or other periods;

schedule based restrictions, e.g., that some slices are available only during certain dates, times, days of weeks, etc.;

location based slices, e.g., that some slices with a user plane may be selected or redirected based on the user's geographical or network location;

online service (e.g., OTT) restrictions such as:
 user account validation, e.g., that some slices are available for certain users and/or for holders of certain tokens;
 that some slices are available only for certain types of content;
 that some slices are available only for certain Uniform Resource Locators (URLs)/Internet Protocols (IPs); and
 that some slices are allocated and/or modified based on the location of the user;

enterprise agreements, which may include requirements such as:
 special privacy/encryption requirements,
 low latency round trip requirements,
 ultra-reliability/coverage requirements,
 pre-approved/authorized devices only requirements,
 Bring Your Own Device (BYOD) slices, and
 enterprise redirected applications, and MVNO/Roaming agreements.

The examples above are intended to be illustrative and not limiting. Other selection processes and/or approval policies making use of information beyond what conventional NSSFs currently use is within the scope of the subject matter of the present disclosure. The concepts disclosed herein are not limited to the particular embodiments disclosed herein but may be applied in a like manner to other sources of information that may be useful to make decisions about network slice selection or allocation.

For example, one opportunity in the Online Services applications domain is to allow the UE to connect to a specific network slice only when an external application (for example a social network) authorizes the connectivity, as there is a business relationship (e.g., subscription) between the UE and the Online Service application.

The present disclosure presents methods and systems for multi-domain network slice selection and approval. In some embodiments, the method is performed in a network node for assisting in network slice selection and approval from a client device (which may be, but is not limited to, a UE or Customer Premise Equipment (CPE)) request related to a given PDU session that may be associated to one or multiple applications (apps), mobile browsers, or external devices using the client device as a device relay that provides connectivity. In some embodiments, the method is performed in a NSSF. The present disclosure provides a mechanism by which a NSSF may determine, for each subscriber, the associated or available NSSAIs, as well as the proper approver or owner work flow of a slice, which may be a trusted or an untrusted network function. This allows the approvers to influence the NSSF network slice selection and/or approval process, e.g., to accommodate a contractual relationship.

Figure 3A:
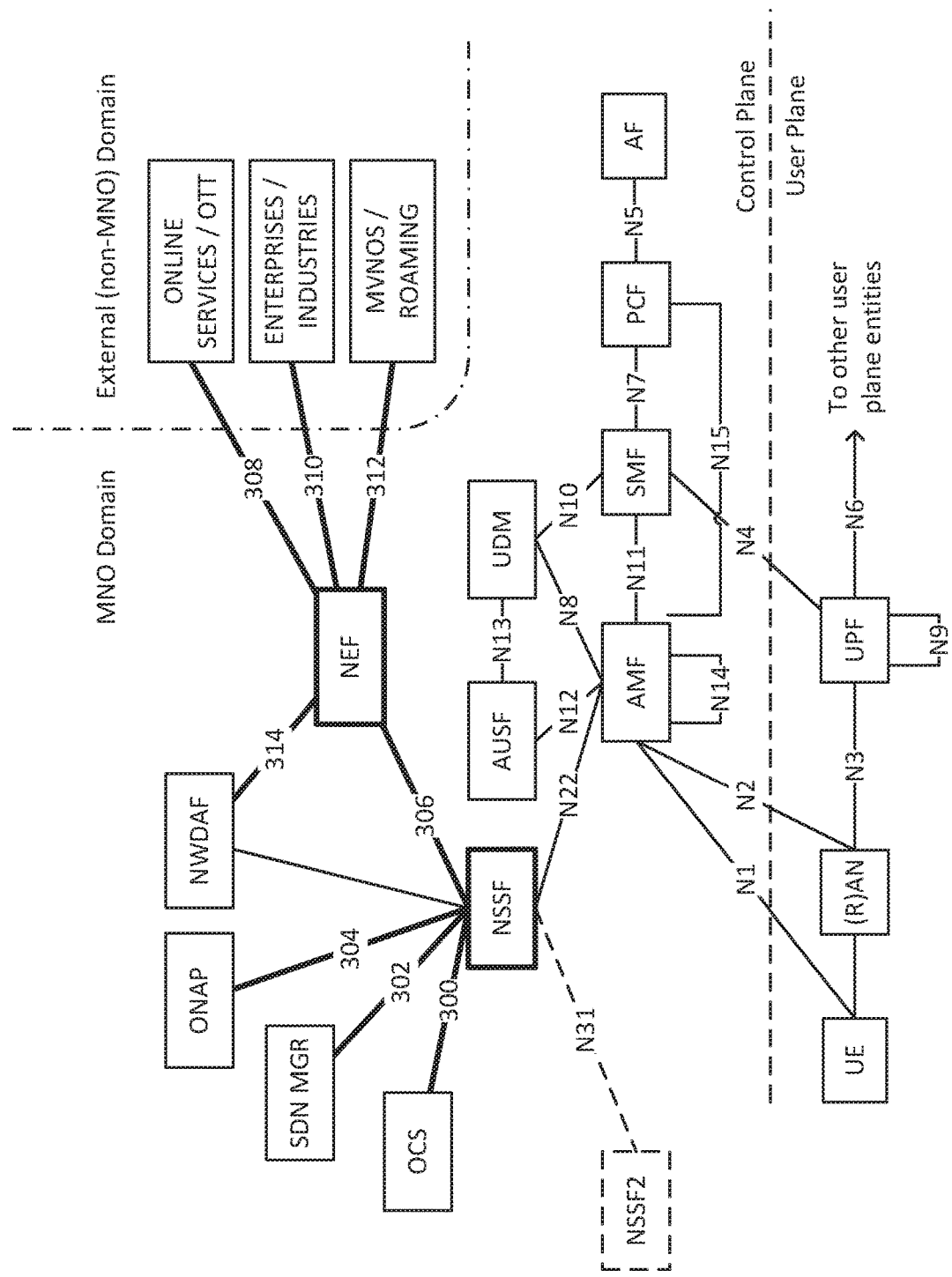
FIGS. 3A and 3B illustrate different embodiments of a 5G network that supports multi-domain network slice selection and approval according to an embodiment of the present disclosure.
Figure 3B:
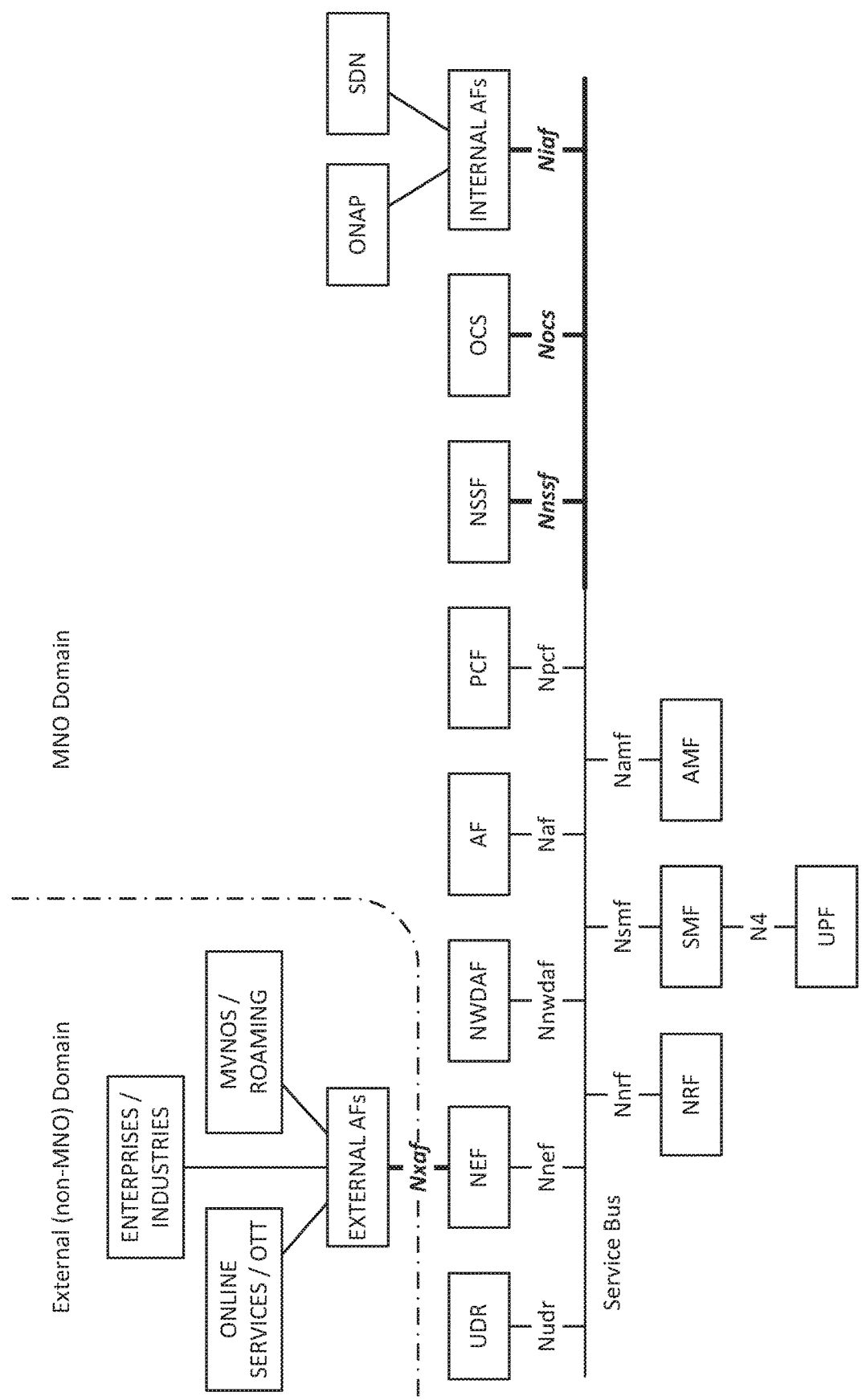

FIGS. 3A and 3B illustrate different embodiments of a 5G network that supports multi-domain network slice selection and approval according to an embodiment of the present disclosure. In the embodiment illustrated in FIG. 3A, the network includes user plane entities such as a UE (or other client device, such as a CPE), a (Radio) Access Network ((R)AN), and a User Plane Function (UPF), as well as control plane entities such as an AMF, a SMF, a Policy Control Function (PCF), an Application Function (AF), a UDM, and an Authentication Server Function (AUSF).

In the embodiment illustrated in FIG. 3A, the network includes an enhanced NSSF that can directly communicate with trusted entities, e.g., entities within the MNO domain, as well as untrusted entities, e.g., entities outside of the MNO domain, with which the NSSF may communicate via a Network Exposure Function (NEF).

FIG. 3A illustrates some of the named (point-to-point) interfaces between entities, such as the N1 interface between the UE and the AMF, the N2 interface between the (R)AN and the AMF, the N3 interface between the (R)AN and the UPF, the N4 interface between the UPF and the SMF, the N31 interface for communicating between NSSFs, and so on. In one embodiment, new named interfaces may be defined for the newly-defined capability for communications between the NSSF and these trusted and untrusted entities.

In the embodiment illustrated in FIG. 3A, for example, a new interface 300 is defined for communication between the NSSF and an OCS node; a new interface 302 is defined for communication between the NSSF and a SDN Manager; a new interface 304 is defined for communication between the NSSF and an ONAP node; and a new interface 306 is defined for communication between the NSSF and a NEF.

Through the NEF, the NSSF can reach untrusted nodes/nodes outside the MNO's domain. In the embodiment illustrated in FIG. 3A, an interface 308 is used for communication between the NEF and online services/OTT nodes; an interface 310 is used for communication between the NEF and Enterprise/Industrial nodes; and an interface 312 is used for communication between the NEF and another MNO/MVNO, e.g., for roaming.

In one embodiment, the NEF may be configured to allow non-MNO entities to have access to MNO entities. In the embodiment illustrated in FIG. 3A, for example, an interface 314 is used for communication between the Network Data Analytics Function (NWDAF) and the NEF, e.g., so that the NWDAF can collect information other than network load conditions, such as end-user experience, device information, etc., from Online Service applications, for example, via the NEF.

FIG. 3B illustrates another embodiment a 5G network that supports multi-domain network slice selection and approval according to the present disclosure. In the embodiment illustrated in FIG. 3B, the network includes a User Data Repository (UDR), a NEF, a NWDAF, an AF, a PCF, an NSSF, an OCS, a Network Resource Function (NRF), an SMF, an AMF, and a UPF. In the embodiment illustrated in FIG. 3B, the NEF communicates with one or more External AFs, which allow access to non-MNO domains, such as an Online Services/OTT domain, Enterprises/Industries domains, and MVNO/Roaming domains. In the embodiment illustrated in FIG. 3B, one or more Internal AFs allow access to MNO domains, such as ONAP and SDN domains.

In the embodiment illustrated in FIG. 3B, an existing Service Bus Architecture (SBA) is extended to include new service based interfaces, shown as thicker lines in FIG. 3B. For example, in one embodiment, a new interface, labeled "Nocs" in FIG. 3B, would allow the OCS to be accessed by any network function directly via the Service Bus. Likewise, in one embodiment, a new interface, labeled "Nnssf" in FIG. 3B, would allow the NSSF to contact any other element available on the Service Bus for the purpose of network slice approval. In one embodiment, the NSSF could use Nnssf to query an NRF in order to identify the address of any network function available in the SBA.

In one embodiment, an interface labeled "Niaf" in FIG. 3B would allow any network function in the SBA to access internal (trusted) application functions for access to ONAP, SDN, or other trusted domains. In one embodiment, an interface labeled "Nxaf" in FIG. 3B would allow any network function in the SBA to go through the NEF to access external (untrusted) application functions for access to untrusted domains.

The examples illustrated in FIGS. 3A and 3B are illustrative and not limiting: the enhanced NSSF may be configured to communicate with other MNO and non-MNO nodes, and is not limited to just the ones illustrated in FIG. 3. Furthermore, a network may have both point-to-point interfaces such as those shown in FIG. 3A and service based interfaces such as those shown in FIG. 3B in any combination and in any configuration.

Figure 4:
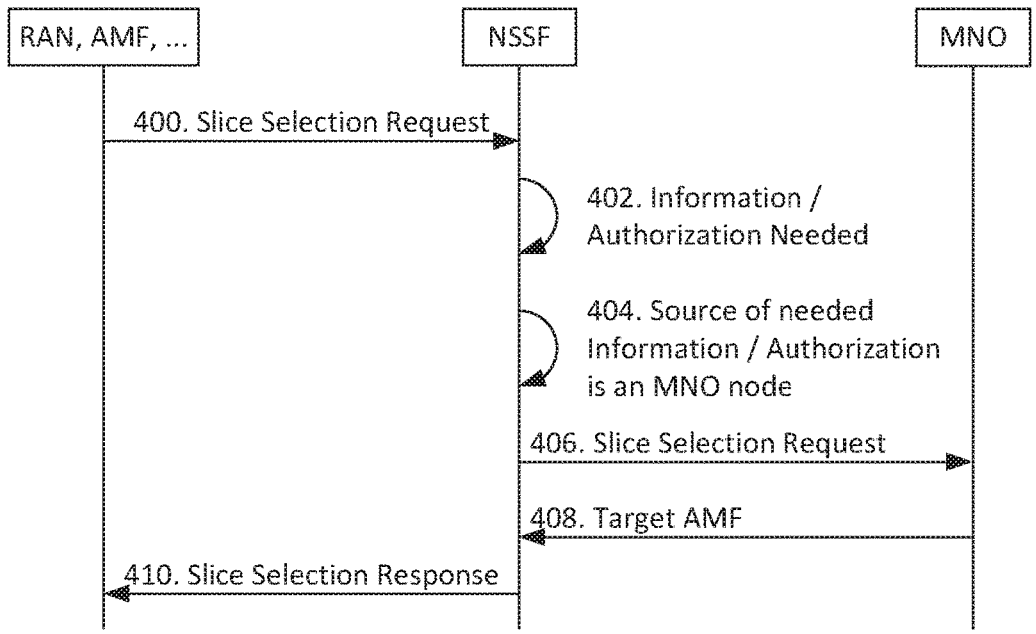
FIG. 4 illustrates a method for multi-domain network slice selection and approval according to an embodiment of the present disclosure.

FIG. 4 illustrates a method for multi-domain network slice selection and approval according to an embodiment of the present disclosure. In the embodiment illustrated in FIG. 4, when a RAN, an AMF, or other entity sends to the NSSF a slice selection request (step 400), the NSSF may determine that additional information or authorization is needed in order to provide the requested network slice (step 402). In the embodiment illustrated in FIG. 4, upon determining that additional information and/or authorization is needed, the NSSF determines that the entity that will supply the needed information/authorization is a node within the MNO, hereinafter referred to as an "MNO node" or as a "trusted node" (step 404). The NSSF contacts the necessary entity (step 406).

In one embodiment, the NSSF may simply forward the original slice request on to the MNO node; in another embodiment, the NSSF may generate a new request to be sent to the MNO node, and that new request may include some, all, or none of the information contained in the original slice request received by the NSSF in step 400.

In the embodiment illustrated in FIG. 4, the MNO node sends a response (step 408) to the NSSF. In one embodiment, the response may directly or indirectly identify a target AMF. The NSSF then sends a slice selection response back to the slice-requesting entity (step 410). Like the response received by the NSSF in step 408, the slice selection response in step 410 may directly or indirectly identify the target AMF. It should be noted that the slice selection response may also indicate that no slice was selection, e.g., that the slice selection request was refused.

Figure 5:
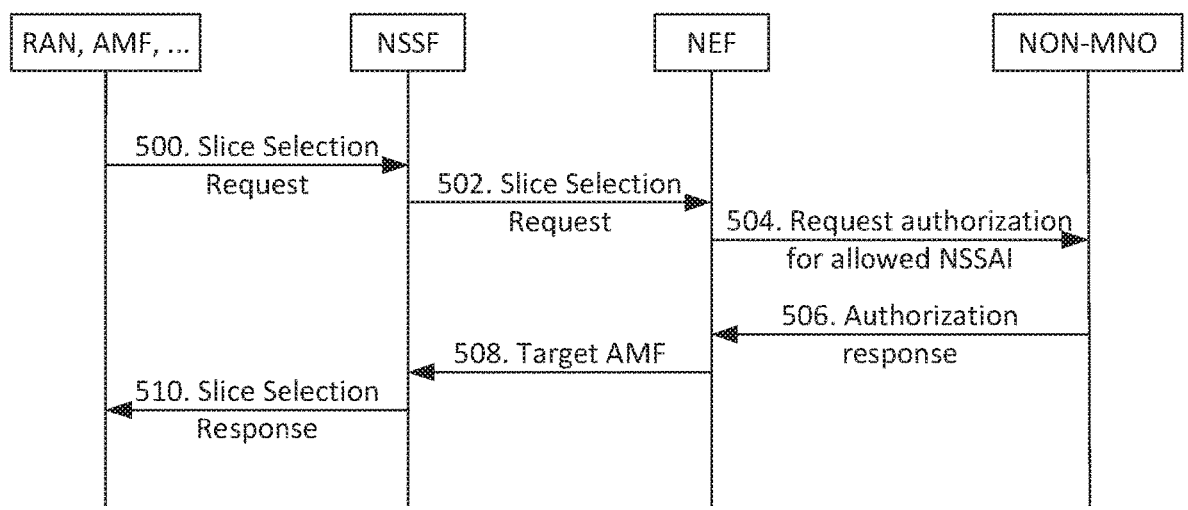
FIG. 5 illustrates a method for multi-domain network slice selection and approval according to another embodiment of the present disclosure.

FIG. 5 illustrates a method for multi-domain network slice selection and approval according to an embodiment of the present disclosure. In the embodiment illustrated in FIG. 5, a slice selection requesting entity, such as a RAN, AMF, or other, sends to the NSSF a slice selection request (step 500). In the embodiment illustrated in FIG. 5, however, the NSSF determines that additional information or authorization is needed from a non-MNO node that is reachable via an NEF. Thus, in the embodiment illustrated in FIG. 5, the NSSF contacts the NEF (step 502); the NEF contacts the non-MNO node (step 504); the non-MNO node responds to the NEF (step 506); and the NEF responds to the NSSF (step 508). The NSSF then sends a slice selection response to the slice selection requesting entity (step 510).

In the embodiment illustrated in FIG. 5, for example, the NSSF receives a slice selection request in step 500 and simply forwards it to the NEF in step 502. The NEF determines that authorization for a particular NSSAI is needed, and so makes such a request to a non-MNO authorizing entity in step 504. The non-MNO authorizing entity responds with an authorization in step 506, which enables the NEF to select a target AMF and convey this to the NSSF in step 508. The NSSF then passes that information on to the requesting entity in step 510.

The specific content of each of the messages illustrated in FIG. 5 is intended to be illustrative and not limiting. For example, in an alternative embodiment, rather than forwarding the slice selection request on to the NEF in step 502, the NSSF may instead generate an authorization request and send that generated request to the NEF, which may then simply forward the generated request to the target non-MNO entity. In another embodiment, one or more of the entities involved in the communications exchange illustrated in FIG. 5 may, prior to sending a message, query a Network Resource Function (NRF) or other database to identify an appropriate NEF, non-MNO node, etc., with which to communicate, e.g., to determine the address to which the message should be sent.

Figure 6:
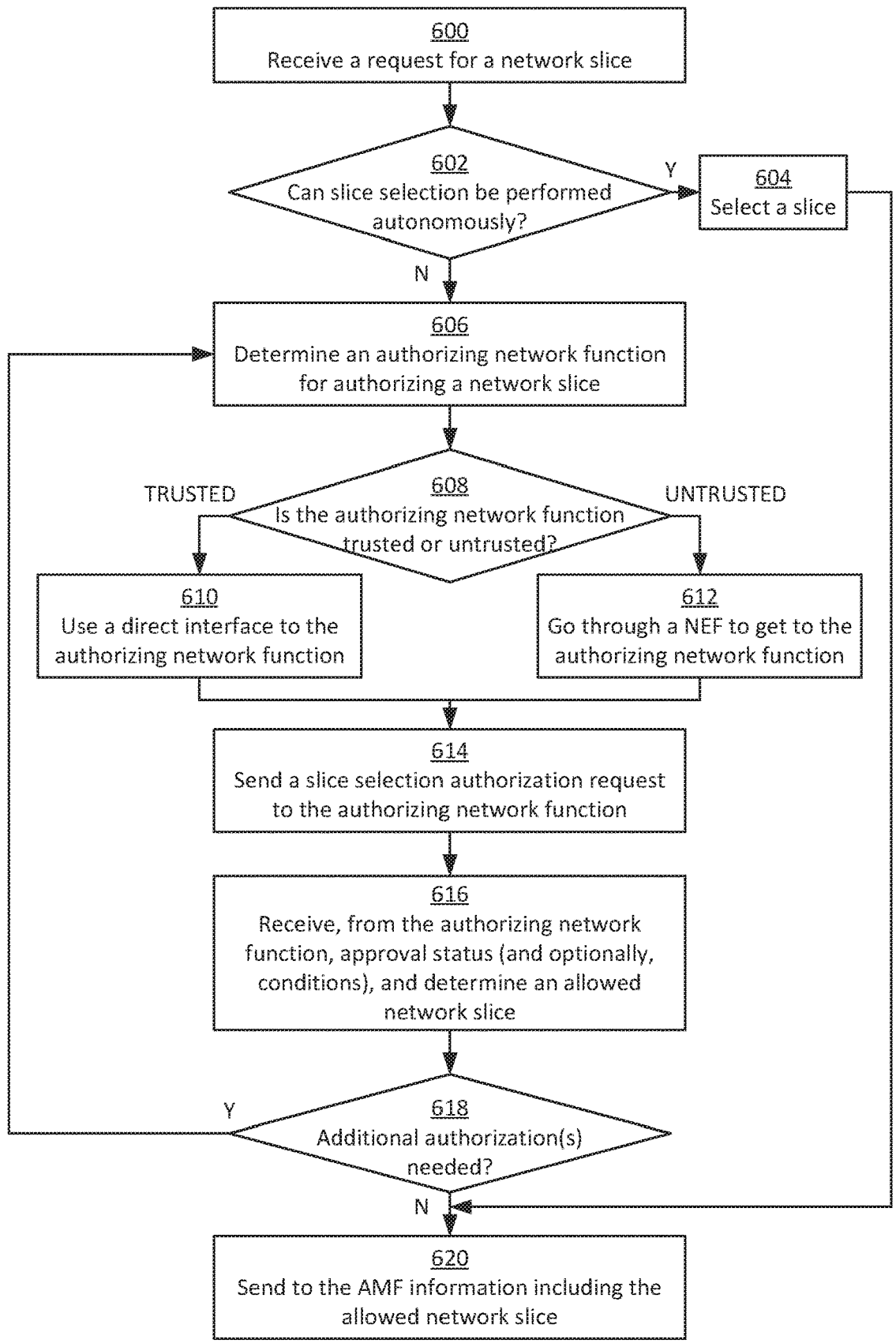
FIG. 6 is a flow chart illustrating an exemplary process, performed in an Network Slice Selection Function (NSSF), for performing multi-domain network slice selection and approval according to an embodiment of the present disclosure.

FIG. 6 is a flow chart illustrating an exemplary process, performed in an NSSF, for performing multi-domain network slice selection and approval according to an embodiment of the present disclosure. In the embodiment illustrated in FIG. 6, the process includes the following steps:

The NSSF receives a request for a network slice (step 600). The request may be issued by an AMF, a RAN, or other node. The request may be on behalf of a UE, a CPE, or other entity. In one embodiment, the request comprises Requested NSSAI, mapping of Requested NSSAI, Subscribed Single NSSAI (S-NSSAI), Tracking Area Identity (TAI), and Subscriber Permanent Identifier (SUPI), which may be obtained from the UE or CPE over the N1 interface.

The NSSF determines if the network slice selection can be performed autonomously (step 602). If the NSSF can autonomously select a slice, it does so (step 604).

In one embodiment, this determination may be performed based on subscriber profile information, with network slice selection parameters that indicate (on a per subscriber or subscriber group) that approval is required and indicate the network function to contact (e.g., the Approver). This information can be stored either internally in the NSSF or in an external database function such as the User Data Repository (UDR).

In one embodiment, this determination may be performed based on the Requested NSSAI, e.g., when the NSSF determines that the UE has requested to connect to a network slice that is subject to external approval, based on NSSF local configuration and/or operator policies.

In one embodiment, this determination may be performed based on the Subscribed NSSAI, e.g., when the UE does not indicate any Requested NSSAI but the NSSF has determined that the Subscribed NSSAI contains a network slice that is subject to external approval, based on NSSF local configuration and/or operator policies.

If the NSSF cannot autonomously select a slice, e.g., because approval is required from an external network function, then the NSSF determines an authorizing network function for authorizing a network slice (step 606).

In one embodiment, the NSSF determines a trust status of the authorizing network function (step 608). If the authorizing network function is trusted, e.g., if the authorizing network function is within the domain of the MNO (e.g., within the MNO's service based network functions) such as an OCS, NWDAF, SDN, and/or ONAP, then the NSSF will determine that it can use a direct network interface to the authorizing network function (step 610). In some embodiments, the NSSF may consult a NRF, which will supply the NSSF with the address or identity of the authorizing network function. All of these communications may happen based on a Service Based Architecture (SBA) already determined by 5G specifications.

If the authorizing network function is untrusted, in the example illustrated in FIG. 6, the NSSF may contact the authorizing network function by way of the NEF (step 612). In one embodiment, an untrusted authorizing network function that is within the MNO domain may be handled differently from an untrusted authorizing network function that is not within the MNO domain. For example, in one embodiment, for an untrusted authorizing network function that is not within the MNO domain, it may be mandatory that access be via the NEF, while an untrusted authorizing network function that is within the MNO domain, access via the NEF may be merely optional, or it may depend on other facts and circumstances. In one embodiment, if the communication could happen without an NEF, e.g., via the SBA already defined by 5G specifications, then communication through the NEF is not preferred, and the alternative communication route, e.g., via the SBA, will be given preference.

In one embodiment, information about the untrusted Approver, including, for example, how to communicate with the Approver, may be provisioned in the NSSF via CRE-ATE/DELETE/EDIT Application Programming Interfaces (APIs) that allow trusted and untrusted network functions to access the NSSF database directly or indirectly (via the NEF). During the contract negotiation phase, this contract negotiation may follow the concept of a self-provisioning relationship between MNOs and Online Services or Enterprise players or MVNOs, and may be implemented using some type of blockchain contract approval process or other secured method for electronic contract negotiation.

Once the path to be taken to the authorizing network entity is determined (e.g., directly or indirectly via the NEF), a slice selection authorization request is sent to the authorizing network entity (step 614). In one embodiment, the slice selection authorization request comprises a Candidate NSSAI as well as Subscriber information. In one embodiment, information sent to untrusted authorizing network functions may be encrypted or tokenized in order to protect sensitive MNO/subscriber Identifier (ID) information. In one embodiment, a mapping or conversion would be saved at a UDR, Home Subscriber Server (HSS) or other database for tokenized information. When necessary, to convert a token into an internal Subscriber ID information, the external/untrusted network elements may use external IDs and/or associated tokens, to be translated by the MNO trusted network elements into the real Subscriber ID information via NEF (in LTE, via SCEF).

Next, the process includes receiving, directly or indirectly from the authorizing network function, a message comprising information including the approval status, and approval conditions of each network slice included in the Candidate NSSAI (step 616). In one embodiment, if the approval comes with approval conditions, the NSSF may take those into account to derive the Allowed NSSAI (which represents the proper set of network functions that can be delivered as Approved NSSAI).

Examples of approval conditions include, but are not limited to:
  Time based approval: The NSSF may need to (re-)request approval after time expires. If a new approval request is rejected, the NSSF may need to communicate with network slice serving AMF for discontinuation of the slice.
  Approval with mobility restriction:
    The NSSF may need to (re-)request approval when the UE moves out of the current location area (e.g., TAI). If a new approval request is rejected, the NSSF may need to communicate with the network slice serving AMF for discontinuation of the slice.
    The NSSF may need to (re-)request approval when the UE moves out of a current "location fence." A location fence could be a new network function or software function inside an AMF that could manage allowed mobility based on GPS information.

The approval process may require more than one Approver. In one embodiment, only the network slice owner will be allowed to modify network slices parameters. However, because 5G is designed in a way that it should adjust as close as possible to the end user demands, the NSSF may need to talk to more than just one Approver during the selection process. Thus, at step 618, the NSSF may check to see if additional authorizations or other information are needed. If so, the process performs steps 606 through 616 until no more authorizations or information is needed.

Finally, at step 620, the NSSF responds to the issuer of the original request for a network slice. This response may comprise information such as the Allowed network slice. When the issuer of the original request is an AMF, the response may follow the current specifications for TS 23.501.

In one embodiment, the NSSF may support the creation of one or more network slice approval process workflows. For example, in one workflow, the NSSF may request approval from an Online Service network slice owner, but then check an OCS node for credit approval, and then finally check a NWDAF for load conditions. In other words, the NSSF can check to make sure that (i) the slice selection is allowed by the subscription provider, (ii) the user has enough in his or her account to pay for the access, and (iii) the network traffic is light enough to allow the activity. This is just an illustrative example. Paths requiring multiple levels of approval may include for example interrogation of trusted and/or untrusted approvers before the slice is approved.

The processes illustrated herein may be part of a registration procedure, an AMF reallocation procedure, or other procedure that may involve activity by the NSSF, including but not limited to network slice selection and approval.

Figure 7:
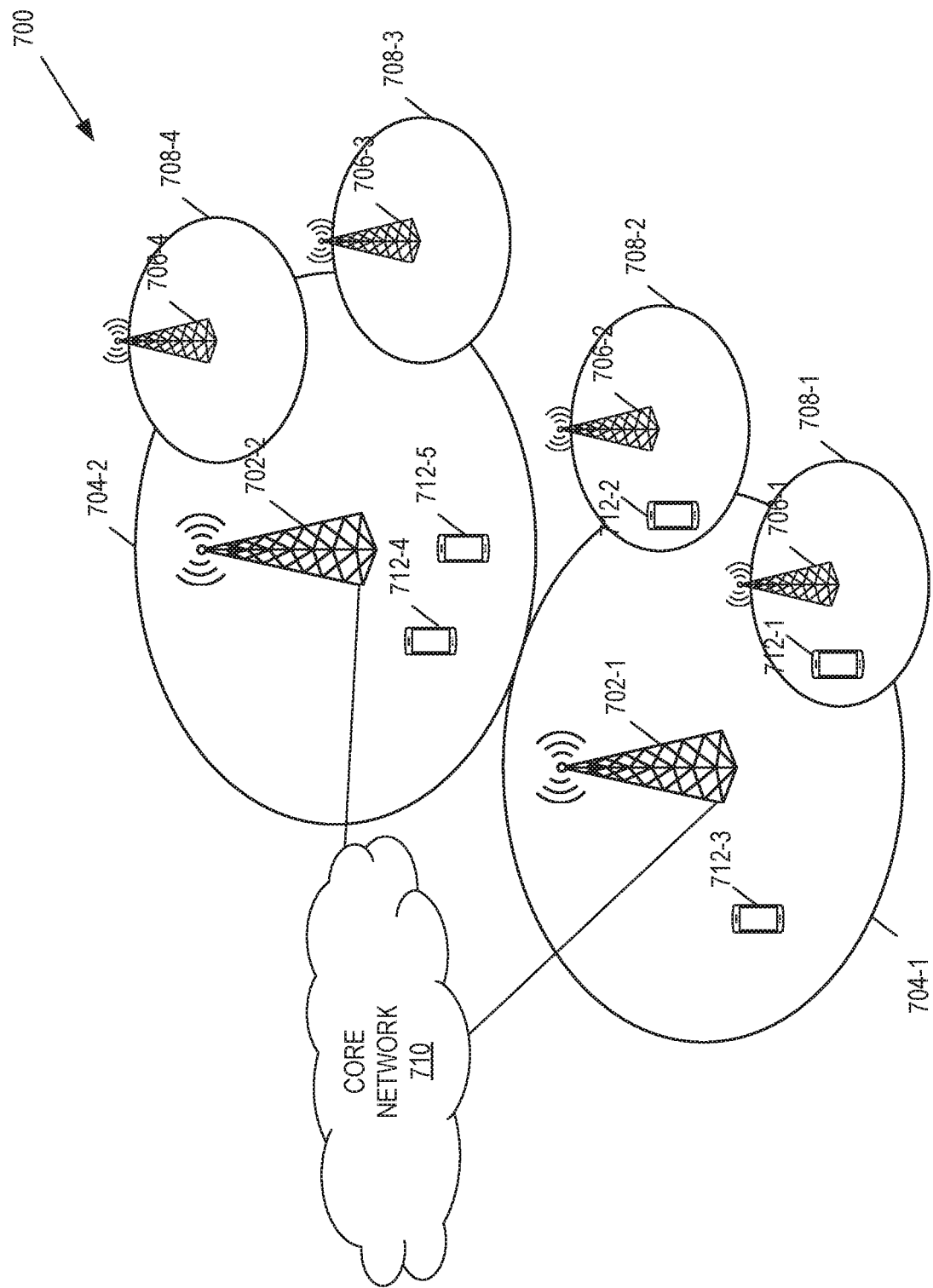
FIG. 7 illustrates one example of a cellular communications network according to some embodiments of the present disclosure.

FIG. 7 illustrates one example of a cellular communications network 700 according to some embodiments of the present disclosure. In the embodiments described herein, the cellular communications network 700 is a 5G NR network. In this example, the cellular communications network 700 includes base stations 702-1 and 702-2, which in LTE are referred to as eNBs and in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The cellular communications network 700 also includes a number of low power nodes 706-1 through 706-4 controlling corresponding small cells 708-1 through 708-4. The low power nodes 706-1 through 706-4 can be small base stations (such as pico or femto base stations), Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The base stations 702 (and optionally the low power nodes 706) are connected to a core network 710.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs.

Figure 8:
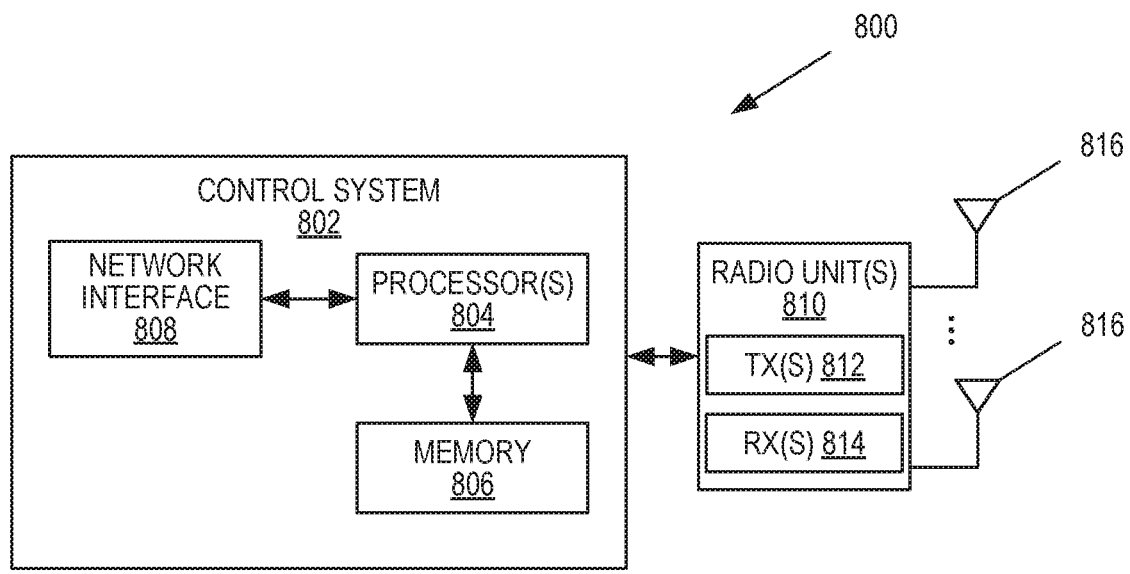
FIG. 8 is a schematic block diagram of a radio access node according to some embodiments of the present disclosure.

FIG. 8 is a schematic block diagram of a radio access node 800 according to some embodiments of the present disclosure. The radio access node 800 may be, for example, a base station 702 or 706. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. In addition, the radio access node 800 includes one or more radio units 810 that each includes one or more transmitters 812 and one or more receivers 814 coupled to one or more antennas 816. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
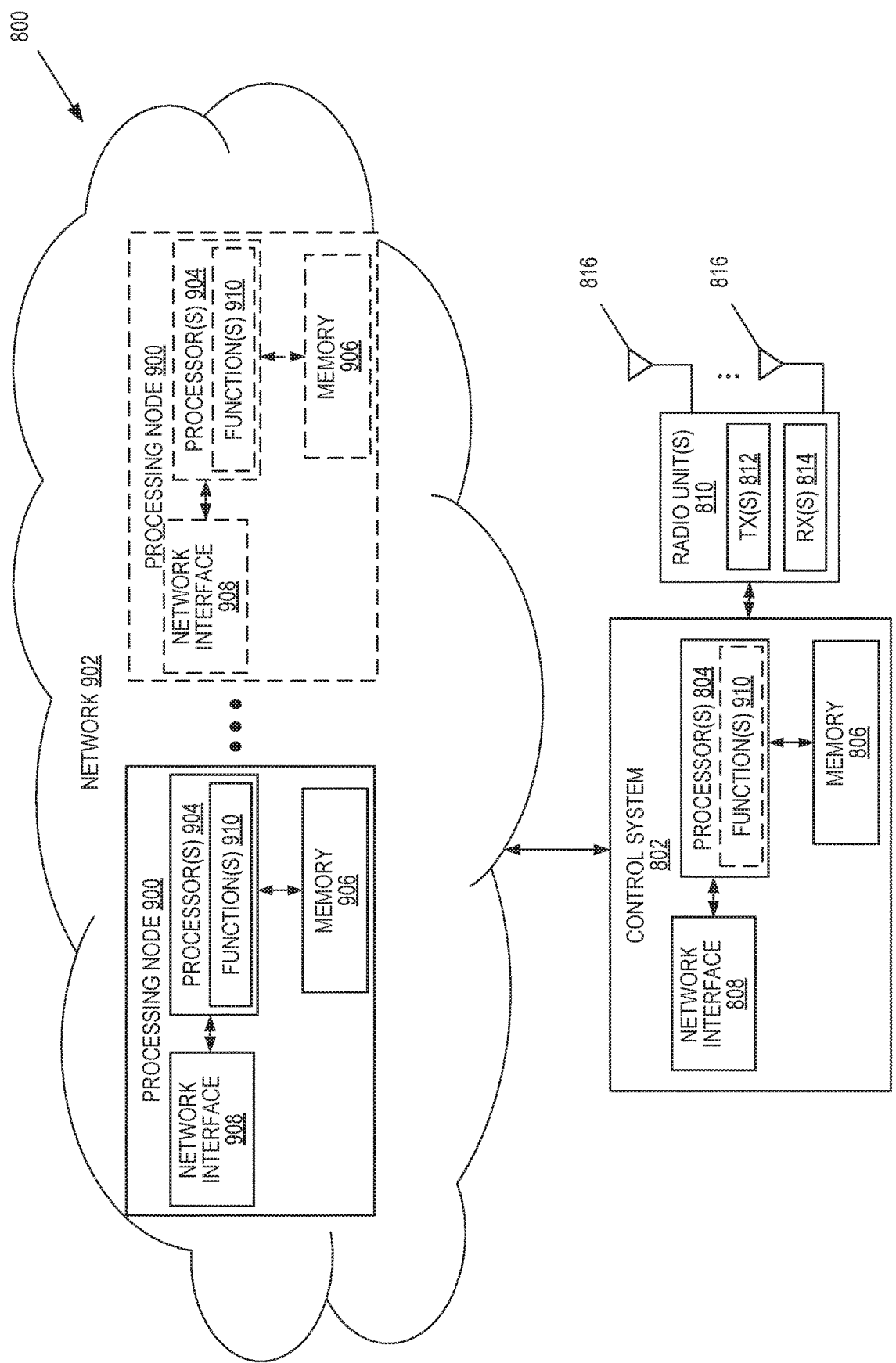
FIG. 9 is a schematic block diagram that illustrates a virtualized embodiment of the radio access node of FIG. 8 according to some embodiments of the present disclosure.

FIG. 9 is a schematic block diagram that illustrates a virtualized embodiment of the radio access node 800 according to some embodiments of the present disclosure. In one embodiment, for example, the radio access node 800 is a virtualized NSSF. This discussion is equally applicable to other types of network nodes. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes the control system 802 that includes the one or more processors 804 (e.g., CPUs, ASICs, FPGAs, and/or the like), the memory 806, and the network interface 808 and the one or more radio units 810 that each includes the one or more transmitters 812 and the one or more receivers 814 coupled to the one or more antennas 816, as described above. The control system 802 is connected to the radio unit(s) 810 via, for example, an optical cable or the like. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
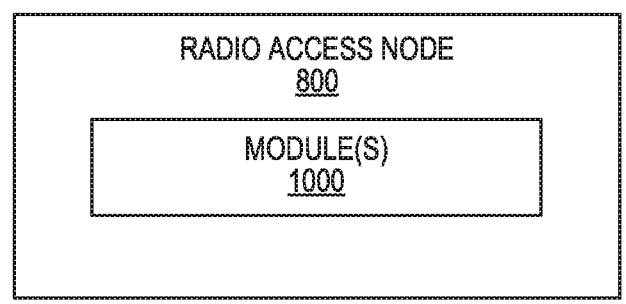
FIG. 10 is a schematic block diagram of the radio access node of FIG. 8 according to some other embodiments of the present disclosure.

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
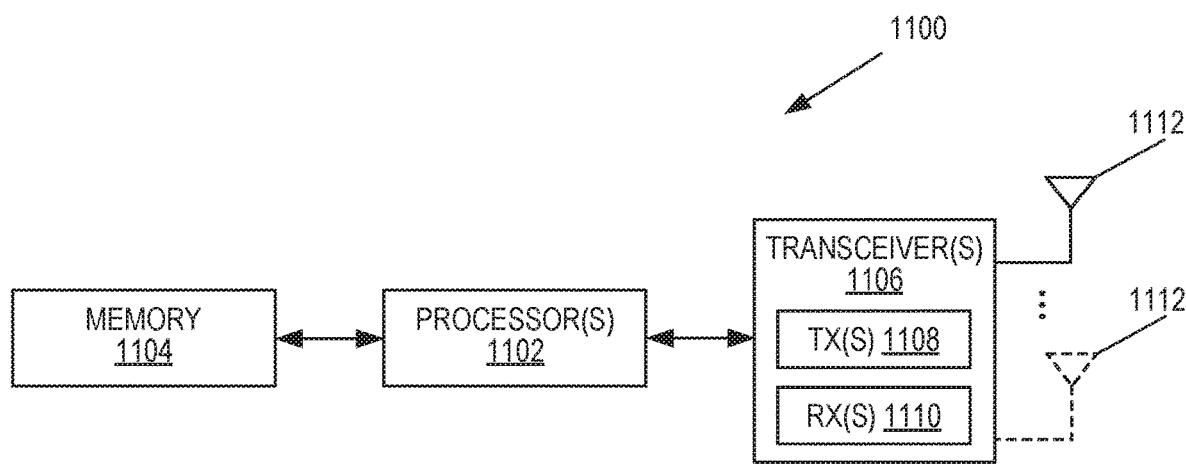
FIG. 11 is a schematic block diagram of a client device according to some embodiments of the present disclosure.

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. In some embodiments, the functionality of the UE 1100 described above may be fully or partially implemented in software that is, e.g., stored in the memory 1104 and executed by the processor(s) 1102.

In some embodiments, a computer program including instructions which, when executed by at least one processor, causes the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
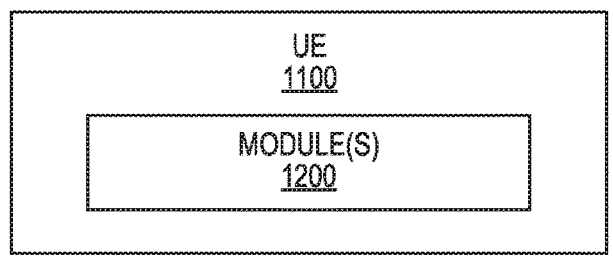
FIG. 12 is a schematic block diagram of the client device of FIG. 11 according to some other embodiments of the present disclosure.

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein.

Figure 13:
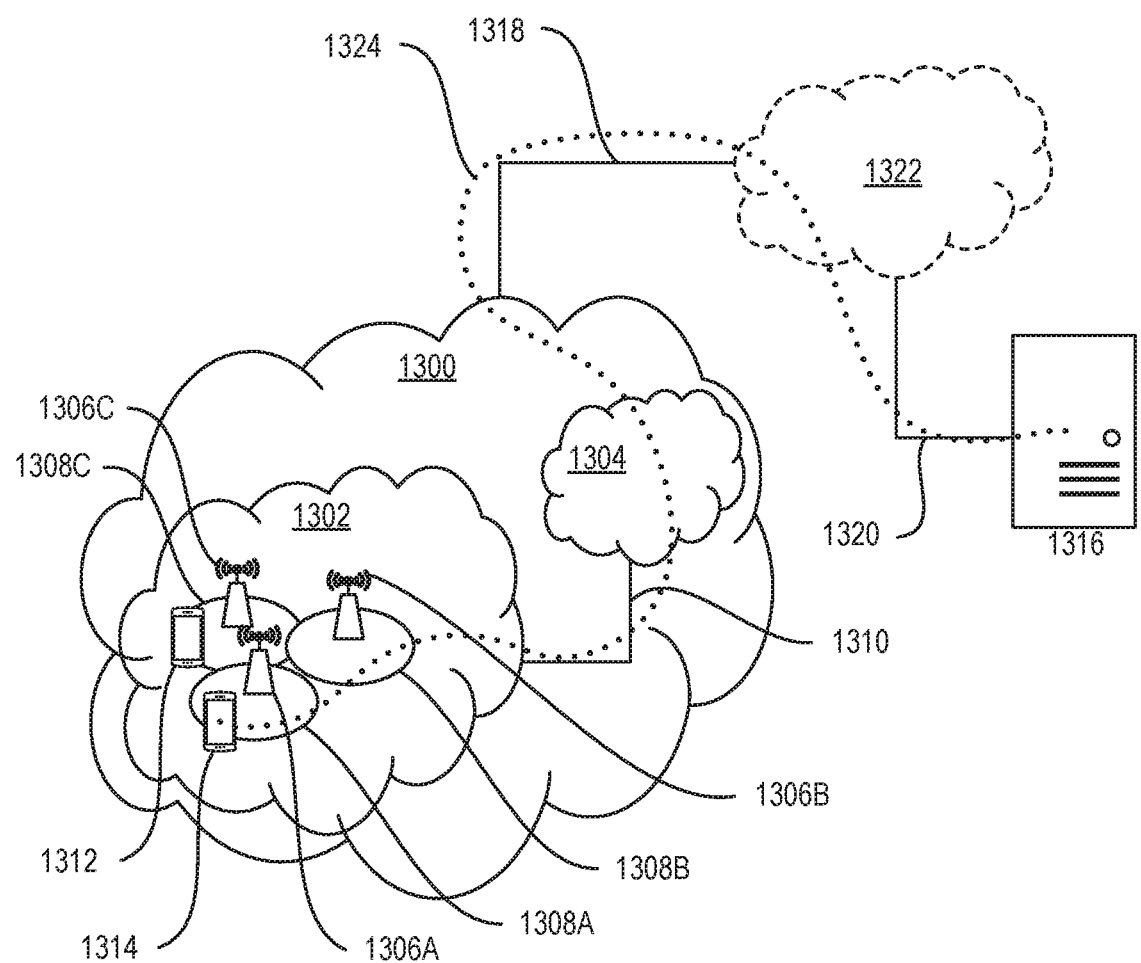
FIG. 13 illustrates a telecommunication network connected via an intermediate network to a host computer in accordance with some embodiments of the present disclosure.

FIG. 13 illustrates an exemplary communications system according to some embodiments of the present disclosure. With reference to FIG. 13, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as Node Bs (NBs), eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an OTT/Online Service (OS) provider connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14.

Figure 14:
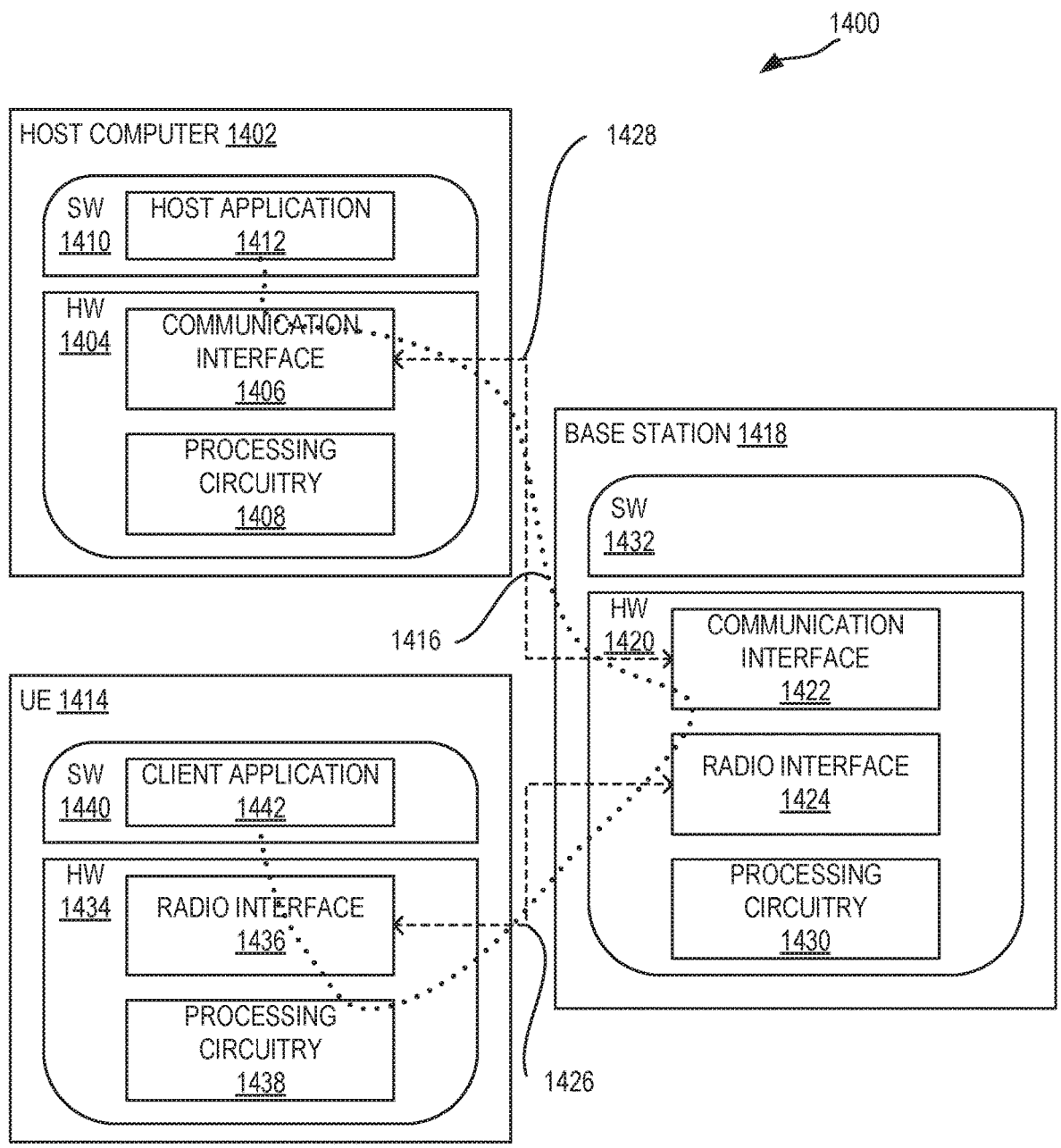
FIG. 14 is a generalized block diagram of a host computer communicating via a base station with a client device over a partially wireless connection in accordance with some embodiments of the present disclosure.

FIG. 14 illustrates an exemplary communications system according to some embodiments of the present disclosure. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain the wireless connection 1426 with the base station 1418 serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and, independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment. More precisely, the teachings of these embodiments may improve the manner in which the UE 1414 may select a network slice and thereby provide benefits such as the ability to use additional information from both MNO and non-MNO authorizing network functions as well as their combinations to make slice selection and approval decisions.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer's 1402 measurements of throughput, propagation times, latency, and the like. The measurements may be implemented in that the software 1410, 1440 causes messages to be transmitted, in particular empty or 'dummy' messages, using the OTT connection 1416 while it monitors propagation times, errors, etc.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600, the host computer provides user data. In an optional sub-step (not shown) of step 1600, the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804, the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols, as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the invention, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GS Fifth Generation System
AF Application Function
AMF Core Access and Mobility Management Function
AN Access Network
AP Access Point
API Application Programming Interface
APN Access Point Name
ASIC Application Specific Integrated Circuit
AUSF Authentication Server Function
B2B Business-to-Business
BYOD Bring Your Own Device
CPE Customer Premise Equipment
CPU Central Processing Unit
DECOR Dedicated Core Network
DSP Digital Signal Processor
eDECOR Enhanced Dedicated Core Network
eNB Enhanced or Evolved Node B
EPC Evolved Packet Core
FPGA Field Programmable Gate Array
gNB New Radio Base Station
HPLMN Home Public Land Mobile Network
HSS Home Subscriber Server
ID Identity/Identifier
IMS Internet Protocol Multimedia Subsystem
IP Internet Protocol
LTE Long Term Evolution
MBB Mobile Broadband
MME Mobility Management Entity
MNO Mobile Network Operator
MSISDN Mobile Station International Subscriber Directory Number
MTC Machine Type Communication
MVNO Mobile Virtual Network Operator
NB Node B
NEF Network Exposure Function
NF Network Function
NR New Radio
NRF Network Resource Function
NSI Network Slice Instance
NSSAI Network Slice Selection Assistance Information
NSSF Network Slice Selection Function
NWDA Network Data Analytics [and Automation]
NWDAF Network Data Analytics Function
OCS Online Charging System
ONAP Open Network Automation Platform
OS Online Service
OTT Over-the-Top
PCF Policy Control Function
PDU Protocol Data Unit
PGW, P-GW Packet Data Network Gateway
PLMN Public Land Mobile Network
QCI Quality of Service Class Identifier
QoS Quality of Service
RAM Random Access Memory
RAN Radio Access Network
RAT Radio Access Technology
ROM Read Only Memory
RRH Remote Radio Head
SBA Service Based Architecture
SCEF Service Capability Exposure Function
SD Slice Differentiator
SDN Software Defined Network
SMF Session Management Function
S-NSSAI Single Network Slice Selection Assistance Information
SST Slice Service Type
SUPI Subscriber Permanent Identifier
TAI Tracking Area Identity
TS Technical Specification
UDM Unified Data Management
UDR User Data Repository
UE User Equipment
UPF User Plane Function
URL Uniform Resource Locator
VoLTE Voice over Long Term Evolution Those skilled in the art will recognize improvements and modifications to the embodiments of the present disclosure. All such improvements and modifications are considered within the scope of the concepts disclosed herein.

What is claimed is:

1. A method for performing multi-domain network slice selection and approval, the method being performed by a network node in a telecommunications network, the method comprising:
   receiving, from a requesting entity, a request for a network slice for use by a client device;
   determining that the network slice selection requires approval;
   upon determining that the network slice selection requires approval, identifying an authorizing network function for authorizing the network slice for the client device;

determining a trust status of the authorizing network function;

identifying, based on the trust status of the authorizing network function, a network interface to use when communicating with the authorizing network function, wherein a first network interface is used when the authorizing network function is trusted and wherein a second network interface is used when the authorizing network function is untrusted;

sending a slice selection authorization request to the authorizing network function via the identified network interface;

receiving, from the authorizing network function, an approval status of the network slice and determining, based on the approval status, an allowed network slice; and sending, to the requesting entity, information including the allowed network slice.

2. The method of claim 1 wherein the network node comprises a Fifth Generation, 5G, telecommunications network node.

3. The method of claim 1 wherein the client device comprises a User Equipment, UE, or a Customer Premises Equipment, CPE.

4. The method of claim 1 wherein the network node that performs the method comprises a Network Slice Selection Function, NSSF.

5. The method of claim 1 wherein the requesting entity comprises a Core Access and Mobility Management Function, AMF.

6. The method of claim 1 wherein the request for the network slice comprises:
a requested Network Slice Selection Assistance Information, NSSAI;
a mapping of the requested NSSAI;
a subscribed NSSAI;
a Tracking Area Identity, TAI; and
a Subscriber Permanent Identity, SUPI.

7. The method of claim 6 wherein the SUPI is obtained from the client device via a N1 interface.

8. The method of claim 1 wherein the determination that the network slice selection requires approval is based on subscriber profile information.

9. The method of claim 8 wherein the subscriber profile information comprises network slice selection parameters that indicate, on a per subscriber or per subscriber group basis, that approval is required and identify the authorizing network function.

10. The method of claim 8 wherein the subscriber profile information is stored within the network node.

11. The method of claim 8 wherein the subscriber profile information is stored in a database outside of the network node.

12. The method of claim 11 wherein the database outside of the network node comprises a Unified Data Management, UDM, node.

13. The method of claim 1 wherein the determination that the network slice selection requires approval is based on a requested Network Slice Selection Assistance Information, NSSAI.

14. The method of claim 13 wherein the requested NSSAI is subject to external approval based on a local configuration of the network node and/or operator policies.

15. The method of claim 1 wherein the determination that the network slice selection requires approval is based a subscribed Network Slice Selection Assistance Information, NSSAI.

16. The method of claim 15 wherein the subscribed NSSAI is subject to external approval based on a local configuration of the network node and/or operator policies.

17. The method of any one of claim 1 wherein the authorizing network function is identified based on a subscriber parameter, a Network Slice Selection Assistance Information, NSSAI, parameter, and/or an approver parameter.

18. The method of claim 1 wherein determining the trust status of the authorizing network function comprises determining that the authorizing network function is a trusted approver.

19. The method of claim 18 wherein identifying the network interface to use when communicating with the authorizing network function comprises determining an address or identifier of the authorizing network function.

20. The method of claim 19 wherein determining the address or identifier of the authorizing network function comprises querying a Network Resource Function, NRF, which provides the address or identifier of the authorizing network function.

21. The method of claim 19 wherein determining the address or identifier of the authorizing network function comprises determining the address or identifier of the authorizing network function via information provisioned in the network node.

22. The method of claim 1 wherein determining the trust status of the authorizing network function comprises determining that the authorizing network function is an untrusted approver.

23. The method of claim 1 wherein identifying the network interface to use when communicating with the authorizing network function comprises identifying the network interface via information provisioned in the network node.

24. The method of claim 23 wherein the information provisioned in the network node is provisioned via an Application Programming Interface, API, that allows trusted and untrusted network functions to communicate with the network node.

25. The method of claim 24 wherein an Application Programming Interface, API, allows trusted and untrusted network functions to communicate with the network node directly or indirectly via a Network Exposure Function, NEF.

26. The method of claim 24 wherein an Application Programming Interface, API, allows trusted and untrusted network functions to access a database maintained by the NSSF.

27. The method of claim 24 wherein an identified Application Programming Interface, API, is provisioned in the network node.

28. The method of claim 1 wherein determining the trust status of the authorizing network function comprises:
upon a determination that the authorizing network function is within a domain of a network operator, determining that the authorizing network function is trusted; and
upon a determination that the authorizing network function is not within a domain of the network operator, determining that the authorizing network function is untrusted.

29. The method of claim 1 wherein identifying the network interface to use when communicating with the authorizing network function based on the trust status of the authorizing network function comprises:
upon a determination that the authorizing network function is untrusted, determining that communication with the authorizing network function must flow through a Network Exposure Function, NEF; and upon a determination that the authorizing network function is trusted, determining that communication with the authorizing network function does not flow through the NEF.

30. The method of claim 1 wherein sending the slice selection authorization request to the authorizing network function via the identified network interface comprises sending the request via a Network Exposure Function, NEF.

31. The method of claim 30 wherein the slice selection authorization request is encrypted or tokenized.

32. The method of claim 1 wherein determining the allowed network slice based on the approval status and approval conditions comprises performing a time-based approval in which the network node requests re-approval after a specified time has expired.

33. The method of claim 1 wherein determining the allowed network slice based on the approval status and approval conditions comprises performing a mobility restriction in which the network node requests re-approval when the client device moves out of its current location area.

34. The method of claim 33 wherein the current location area of the client device comprises a Tracking Area, a Routing Area, a Global Positioning System, GPS, location, or a GPS location area.

35. The method of claim 34 wherein the current location area of the client device comprises a GPS location area tracked by a "digital fence" function within the AMF.

36. The method of claim 32 wherein, upon denial of the request for re-approval, the network node instructs a Core Access and Mobility Management Function, AMF, that is serving the network slice to discontinue serving the network slice.

37. The method of claim 1 further comprising, prior to sending the information including the allowed slice to the requesting entity, determining whether additional information or authorization is needed, and upon determining that additional information or authorization is needed, reiterating the steps starting from identifying the authorizing network function and continuing until no additional information or authorization is needed before proceeding to sending the information including the allowed slice to the requesting entity.

38. The method of claim 1 wherein receiving an approval status from the authorizing network function comprises receiving a pre-approved credit per slice.

39. The method of claim 38 wherein the pre-approved credit per slice is based on information provided by a Pre-Paid services node.

40. The method of claim 38 wherein the pre-approved credit per slice defines a data volume, a maximum number of devices, and/or a time limit for the respective slice.

41. The method of claim 1 wherein receiving an approval status comprises receiving an approval status and approval conditions.

42. The method of claim 41 wherein receiving approval conditions from the authorizing network function comprises receiving a mobility restriction.

43. The method of claim 42 wherein receiving a mobility restriction comprises receiving a restriction that a slice is available if the client device is within a defined location.

44. The method of claim 43 wherein the defined location comprises a tracking area, a routing area, and/or a geographic location, area, or volume.

45. The method of claim 41 wherein receiving approval conditions from the authorizing network function comprises receiving a schedule-based restriction.

46. The method of claim 45 wherein the schedule-based restriction comprises a restriction that a slice is available during defined dates, times, days of the week, weeks or months of the year, seasons, and/or holidays.

47. The method of claim 41 wherein receiving approval conditions from the authorizing network function comprises receiving a location-based slice restriction.

48. The method of claim 47 wherein receiving a location-based slice restriction comprises receiving a restriction that a User Plane Function, UPF, is selected or redirected based on a user's geographical location and/or network location.

49. The method of claim 41 wherein receiving approval conditions from the authorizing network function comprises receiving an online services or Over-the-Top, OTT, approval condition.

50. The method of claim 49 wherein receiving an online services or Over-the-Top, OTT, approval condition comprises receiving at least one of:
a user account validation;
a restriction that a slice is available for a defined content type;
a restriction that a slice is available for a defined Uniform Resource Locator, URL, or Internet Protocol, IP, address;
a restriction that a slice is allocated or modified based on a location of a user of the slice.

51. The method of claim 41 wherein receiving approval conditions from the authorizing network function comprises receiving an enterprise agreement requirement.

52. The method of claim 51 wherein receiving an enterprise agreement requirement comprises receiving at least one of:
a privacy requirement;
an encryption requirement;
a reliability or ultra-reliability requirement;
a pre-approval requirement;
an authorized devices requirement;
a Bring Your Own Device, BYOD, requirement; and
an enterprise-redirected application.

53. A network node for performing multi-domain network slice selection and approval comprises a network interface and circuitry configured to:
receive, from a requesting entity, a request for a network slice for use by a client device;
determine that the network slice selection requires approval;
upon determining that the network slice selection requires approval, identify an authorizing network function for authorizing the network slice for the client device;
determine a trust status of the authorizing network function;
identify, based on the trust status of the authorizing network function, a network interface to use when communicating with the authorizing network function, wherein a first network interface is used when the authorizing network function is trusted and wherein a second network interface is used when the authorizing network function is untrusted;
send a slice selection authorization request to the authorizing network function via the identified network interface;

receive, from the authorizing network function, an approval status of the network slice and determine, based on the approval status, an allowed network slice; and send, to the requesting entity, information including the allowed network slice.

54. The network node of claim 53 wherein the network node comprises a Network Slice Selection Function, NSSF.

* * * * *